US012241235B2

(12) United States Patent
Ushijima et al.

(10) Patent No.: US 12,241,235 B2
(45) Date of Patent: Mar. 4, 2025

(54) WORK MACHINE

(71) Applicant: KOMATSU LTD., Tokyo (JP)

(72) Inventors: Harunobu Ushijima, Tokyo (JP);
Satoru Ide, Tokyo (JP); Hiroshi Yamashita, Tokyo (JP)

(73) Assignee: KOMATSU LTD., Tokyo (JP)

( * ) Notice: Subject to any disclaimer, the term of this patent is extended or adjusted under 35 U.S.C. 154(b) by 501 days.

(21) Appl. No.: 17/619,333

(22) PCT Filed: Jul. 8, 2020

(86) PCT No.: PCT/JP2020/026676
§ 371 (c)(1),
(2) Date: Dec. 15, 2021

(87) PCT Pub. No.: WO2021/010250
PCT Pub. Date: Jan. 21, 2021

(65) Prior Publication Data
US 2022/0364333 A1 Nov. 17, 2022

(30) Foreign Application Priority Data

Jul. 12, 2019 (JP) .................................. 2019-130544

(51) Int. Cl.
*G06F 17/00* (2019.01)
*E02F 9/20* (2006.01)
(Continued)

(52) U.S. Cl.
CPC ............ *E02F 9/262* (2013.01); *E02F 9/2004* (2013.01); *E02F 9/2033* (2013.01); *E02F 9/24* (2013.01);
(Continued)

(58) Field of Classification Search
CPC ....... E02F 9/262; E02F 9/2004; E02F 9/2033; E02F 9/24; E02F 9/2228; E02F 9/2285;
(Continued)

(56) References Cited

U.S. PATENT DOCUMENTS 9,332,229 B2 * 5/2016 Ishimoto ................ G06V 20/58
9,457,718 B2 * 10/2016 Husted ..................... B60R 1/27
(Continued)

FOREIGN PATENT DOCUMENTS

CN        103562465 A    2/2014
CN        107075840 A    8/2017
(Continued)

OTHER PUBLICATIONS

Proximity Warning and Excavator Control System for Prevention of Collision Accidents (Year: 2017).*

*Primary Examiner* — Ronnie M Mancho
(74) *Attorney, Agent, or Firm* — Faegre Drinker Biddle & Reath LLP

(57) ABSTRACT

A work machine includes a manipulation device, a surrounding area monitoring device, and a controller. The manipulation device outputs a manipulation signal to operate the work machine. The surrounding area monitoring device serves as a device for detecting whether an object to be recognized is present or not inside a set region that is set in a surrounding area of the work machine. The controller controls the work machine. The controller is capable of switching a setting of an object sensing function between execution and non-execution, the object sensing function being to restrict movement of the work machine when it is detected that the object is present inside the set region. When the manipulation signal is detected in a state where the
(Continued)

object sensing function is set at non-execution, the controller switches the setting of the object sensing function to execution.

8 Claims, 5 Drawing Sheets

(51) Int. Cl.
*E02F 9/24* (2006.01)
*E02F 9/26* (2006.01)
*E02F 9/22* (2006.01)

(52) U.S. Cl.
CPC ........... *E02F 9/2228* (2013.01); *E02F 9/2285* (2013.01); *E02F 9/2296* (2013.01)

(58) Field of Classification Search
CPC ......... E02F 9/2296; E02F 9/2253; E02F 9/26; E02F 9/20; H04N 7/181; H04N 7/18
USPC .......................................................... 701/50
See application file for complete search history.

(56) References Cited

U.S. PATENT DOCUMENTS

| | | | |
|---|---|---|---|
| 10,717,200 B2* | 7/2020 | Machida | E02F 9/261 |
| 10,777,023 B2* | 9/2020 | Mizuochi | E02F 9/24 |
| 10,876,275 B2* | 12/2020 | Yamazaki | E02F 9/20 |
| 10,907,324 B2* | 2/2021 | Shimoda | E02F 9/24 |
| 11,111,654 B2* | 9/2021 | Hiekata | E02F 9/265 |
| 11,142,891 B2* | 10/2021 | Nishizawa | E02F 9/265 |
| 11,148,593 B2* | 10/2021 | Izumikawa | G08B 25/08 |
| 11,346,085 B2* | 5/2022 | Fujiwara | E02F 9/262 |
| 11,574,534 B2* | 2/2023 | Maley | G08B 21/02 |
| 11,879,233 B2* | 1/2024 | Narikawa | E02F 9/262 |
| 2013/0088593 A1* | 4/2013 | Ishimoto | E02F 9/226 |
| | | | 348/143 |
| 2014/0060026 A1 | 3/2014 | Himoto et al. | |
| 2014/0111648 A1* | 4/2014 | Ishimoto | B60R 1/00 |
| | | | 348/148 |
| 2017/0305018 A1* | 10/2017 | Machida | B25J 9/1674 |
| 2018/0209122 A1 | 7/2018 | Kiyota et al. | |
| 2019/0360172 A1 | 11/2019 | Yamamoto | |
| 2019/0360176 A1* | 11/2019 | Shimoda | G01S 17/931 |
| 2020/0226849 A1* | 7/2020 | Mizuochi | G06Q 10/1091 |
| 2021/0087794 A1* | 3/2021 | Yamamoto | E02F 9/2033 |
| 2021/0214923 A1* | 7/2021 | Fujiwara | E02F 9/262 |
| 2021/0262196 A1* | 8/2021 | Ito | E02F 9/268 |
| 2021/0395981 A1* | 12/2021 | Sasaki | H04N 7/183 |
| 2022/0002970 A1* | 1/2022 | Kurosawa | E02F 9/2033 |
| 2022/0213669 A1* | 7/2022 | Eguchi | E02F 9/26 |
| 2022/0298756 A1* | 9/2022 | Eguchi | G06T 11/203 |
| 2022/0315396 A1* | 10/2022 | Matsushita | B66C 23/82 |
| 2022/0316184 A1* | 10/2022 | Moriki | E02F 9/2033 |
| 2022/0412052 A1* | 12/2022 | Moriki | E02F 9/2033 |
| 2023/0272600 A1* | 8/2023 | Eguchi | E02F 9/26 |
| | | | 340/686.6 |
| 2023/0407600 A1* | 12/2023 | Danguchi | E02F 9/26 |
| 2023/0407602 A1* | 12/2023 | Danguchi | E02F 9/2004 |

FOREIGN PATENT DOCUMENTS

| | | |
|---|---|---|
| CN | 107925745 A | 4/2018 |
| JP | 3613162 B2 | 1/2005 |
| JP | 2011-179279 A | 9/2011 |
| JP | 2013-36270 A | 2/2013 |
| JP | 2013-147887 A | 8/2013 |
| JP | 2017-057714 A | 3/2017 |
| JP | 6420432 B2 | 11/2018 |
| JP | 6427597 B2 | 11/2018 |
| JP | 2018-197491 A | 12/2018 |
| WO | WO-2018/155567 A1 | 8/2018 |

* cited by examiner

WORK MACHINE

TECHNICAL FIELD

The present disclosure relates to a work machine.

BACKGROUND ART

The following apparatus has conventionally been proposed. A surrounding area monitoring system includes: a human presence sensing unit that senses a human present in a surrounding area of an excavator; and a control unit that switches the state of the excavator between a first state and a second state based on a sensing result from the human presence sensing unit. The first state includes the state in which the movement of the excavator is not restricted, or the state in which an alarm is stopped. The second state includes the state in which the movement of the excavator is restricted or stopped, or the state in which an alarm is output. When a prescribed cancellation condition is satisfied after the state of the excavator is switched to the second state, the control unit brings the state of the excavator back to the first state. The prescribed cancellation condition includes: a condition that a human is not sensed in the surrounding area of the excavator; and a condition that the state of the excavator ensured not to start moving is sensed (for example, see Japanese Patent Laying-Open No. 2018-197491 (PTL 1)).

CITATION LIST

Patent Literature

PTL 1: Japanese Patent Laying-Open No. 2018-197491

SUMMARY OF INVENTION

Technical Problem

The function of sensing whether an obstacle such as a human is present or not in the surrounding area of a work machine does not always need to be maintained in the setting of ON (execution). For example, while a lock lever is in a locked state, the work machine does not move even when an operator manipulates a manipulation device. Thus, since the work machine does not come into contact with an obstacle, no problem occurs even when the function of sensing an obstacle is set at OFF (non-execution). In order to allow the setting of the obstacle sensing function to be switched between ON and OFF in this way, the setting of this function needs to be switched from OFF to ON based on the operator's intention.

The present disclosure provides a work machine capable of switching an object sensing function from OFF to ON as appropriate only when this object sensing function needs to be activated based on the operator's intention of operating the work machine. The object sensing function is to restrict the operation of the work machine when an object to be recognized is present in a surrounding area of the work machine.

Solution to Problem

According to the present disclosure, a work machine including a manipulation device, a surrounding area monitoring device, and a controller is provided. The manipulation device outputs a manipulation signal to operate the work machine. The surrounding area monitoring device serves to detect whether an object to be recognized is present or not inside a set region that is set in a surrounding area of the work machine. The controller controls the work machine. The controller is capable of switching a setting of an object sensing function between execution and non-execution, the object sensing function being to restrict an operation of the work machine when it is detected that the object is present inside the set region. The manipulation device outputs a manipulation signal corresponding to a manipulation of the manipulation device. When a prescribed manipulation signal is detected in a state where the object sensing function is set at non-execution, the controller sets the object sensing function at execution.

Advantageous Effects of Invention

According to the present disclosure, the setting of the object sensing function can be switched from non-execution to execution as appropriate based on the intention of an operator.

DESCRIPTION OF EMBODIMENTS

Figure 1:
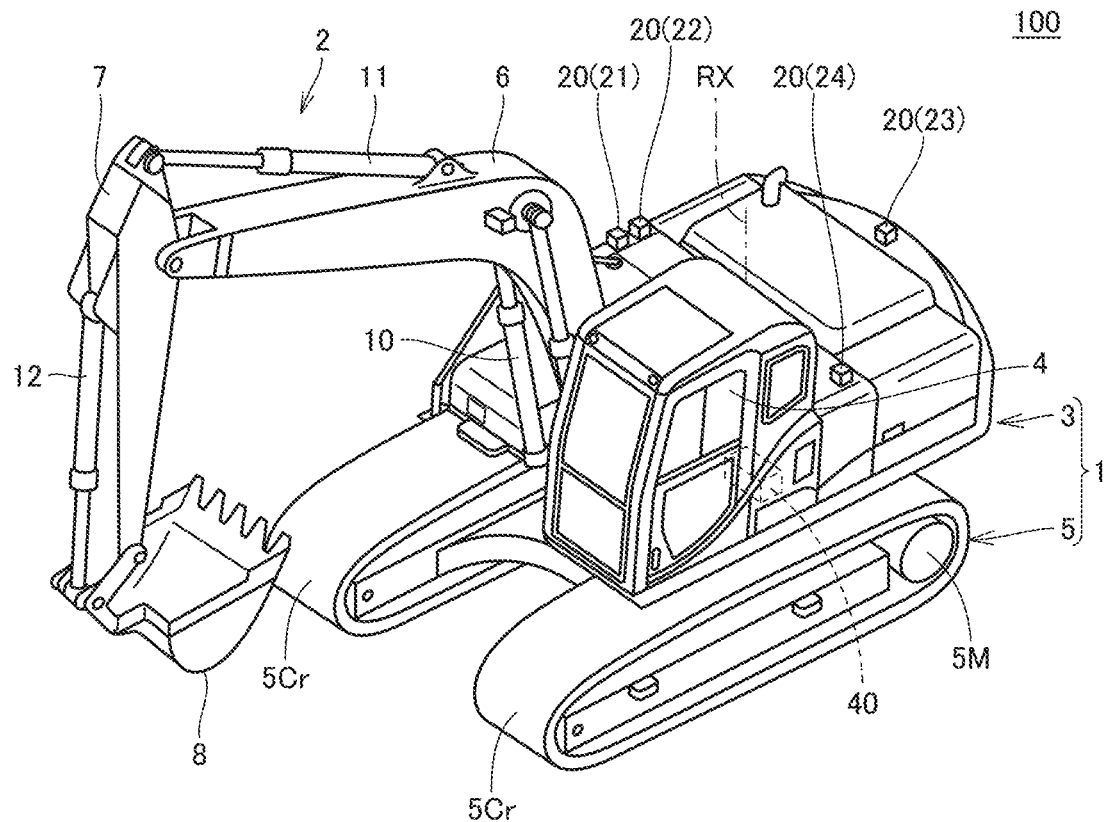
FIG. 1 is a diagram illustrating an external appearance of a hydraulic excavator according to an embodiment.

In the following, embodiments will be described with reference to the accompanying drawings. In the following description, the same components are denoted by the same reference characters. Names and functions thereof are also the same. Accordingly, the detailed description thereof will not be repeated.

First Embodiment

First, the configuration of a hydraulic excavator 100 will be hereinafter described as an example of a work machine. FIG. 1 is a diagram illustrating the external appearance of hydraulic excavator 100 according to an embodiment.

As shown in FIG. 1, hydraulic excavator 100 includes a body 1 and a work implement 2 that operates with hydraulic pressure. Body 1 includes a revolving unit 3 and a traveling unit 5. Traveling unit 5 includes a pair of right and left crawler belts 5Cr and a traveling motor 5M. Hydraulic excavator 100 can travel as crawler belts 5Cr rotate. Traveling motor 5M is an example of a traveling actuator for driving traveling unit 5. By driving by traveling motor 5M, crawler belts 5Cr rotate to thereby cause hydraulic excavator 100 to travel. Traveling motor 5M is a hydraulic motor that is actuated with hydraulic pressure. Note that traveling unit 5 may include wheels (tires).

During the operation of hydraulic excavator 100, traveling unit 5, more specifically, each crawler belt 5Cr, is situated on a reference surface, for example, a ground surface.

Revolving unit 3 is disposed on traveling unit 5 and supported by traveling unit 5. Revolving unit 3 is mounted on traveling unit 5 to be revolvable via a revolving mechanism in an upper portion of traveling unit 5. Revolving unit 3 is mounted on traveling unit 5 to be revolvable about a revolving axis RX with respect to traveling unit 5. Since traveling unit 5 is situated on the ground surface, revolving unit 3 is revolvable with respect to the ground surface.

Revolving unit 3 includes a cab 4. An occupant (an operator) of hydraulic excavator 100, who is aboard cab 4, controls hydraulic excavator 100. Cab 4 is equipped with an operator's seat on which an operator sits. The operator inside cab 4 can manipulate hydraulic excavator 100. The operator inside cab 4 can manipulate work implement 2, can manipulate revolving unit 3 to revolve with respect to traveling unit 5, and can manipulate hydraulic excavator 100 to travel with the help of traveling unit 5.

Revolving unit 3 includes: an engine compartment accommodating an engine; and a counterweight provided in a rear portion of revolving unit 3.

Work implement 2 is supported by revolving unit 3. Work implement 2 is pivotally supported on revolving unit 3 to be operable in the up-down direction, and performs such work as excavation of soil. Work implement 2 includes a boom 6, an arm 7, and a bucket 8. Boom 6 has a base end that is rotatably coupled to revolving unit 3. Arm 7 is rotatably coupled to a leading end of boom 6. Bucket 8 is rotatably coupled to a leading end of arm 7.

Work implement 2 includes a boom cylinder 10, an arm cylinder 11, and a bucket cylinder 12. Boom cylinder 10 drives boom 6. Arm cylinder 11 drives arm 7. Bucket cylinder 12 drives bucket 8. Each of boom cylinder 10, arm cylinder 11, and bucket cylinder 12 serves as a hydraulic cylinder driven with hydraulic oil supplied from a hydraulic pump (see FIG. 2). Each of boom 6, arm 7, and bucket 8 is driven by a hydraulic cylinder, so that work implement 2 can be operated.

Hydraulic excavator 100 is equipped with a camera 20. Camera 20 serves as an imaging device for imaging the surrounding area of hydraulic excavator 100 and obtaining images of the surrounding area of hydraulic excavator 100. Camera 20 is configured to be capable of obtaining current geographical features around hydraulic excavator 100 and also capable of recognizing the presence of an obstacle around hydraulic excavator 100.

Camera 20 includes a right front camera 21, a right side camera 22, a rear camera 23, and a left side camera 24. Right front camera 21 and right side camera 22 are disposed at the right side edge on the upper surface of revolving unit 3. Right front camera 21 is disposed forward of right side camera 22. Right front camera 21 and right side camera 22 are disposed in the vicinity of the center portion of revolving unit 3 in the front-rear direction to be arranged in line front to rear.

Rear camera 23 is disposed at the rear end of revolving unit 3 in the front-rear direction, and located in the center portion of revolving unit 3 in the right-left direction. At the rear end of revolving unit 3, a counter weight is provided for keeping the balance of the vehicle body during excavation and the like. Rear camera 23 is disposed on the upper surface of the counter weight. Left side camera 24 is disposed at the left side edge on the upper surface of revolving unit 3. Left side camera 24 is disposed in the vicinity of the center portion of revolving unit 3 in the front-rear direction.

In the present embodiment, the positional relation of the components in hydraulic excavator 100 will be described with respect to work implement 2.

Boom 6 of work implement 2 pivots about a boom pin provided at the base end of boom 6 with respect to revolving unit 3. A specific portion of boom 6 that pivots with respect to revolving unit 3, for example, the leading end of boom 6, moves along an arcuate track. A plane including this arcuate track is specified. In a plan view of hydraulic excavator 100, this plane is shown as a straight line. The direction in which this straight line extends corresponds to the front-rear direction of body 1 of hydraulic excavator 100 or the front-rear direction of revolving unit 3, and will be hereinafter also simply referred to as a front-rear direction. The right-left direction of body 1 of hydraulic excavator 100 (the vehicle width direction) or the right-left direction of revolving unit 3 corresponds to the direction orthogonal to the front-rear direction in a plan view, and will be hereinafter also simply referred to as a right-left direction.

With respect to the front-rear direction, work implement 2 protrudes from body 1 of hydraulic excavator 100 in the front direction that is opposite to the rear direction. In a facing forward view, the right side and the left side in the right-left direction correspond to the right direction and the left direction, respectively.

The front-rear direction corresponds to the front-rear direction of an operator sitting on an operator's seat inside cab 4. The direction in which the operator sitting on the operator's seat faces corresponds to the front direction. The direction rearward of the operator sitting on the operator's seat corresponds to the rear direction. The right-left direction corresponds to the right-left direction of the operator sitting on the operator's seat. In the state where the operator sitting on the operator's seat faces forward, the right side and the left side correspond to the right direction and the left direction, respectively.

Hydraulic excavator 100 is equipped with a main controller 40. Main controller 40 controls the operation of hydraulic excavator 100. The control of hydraulic excavator 100 by main controller 40 will be described later.

Figure 2:
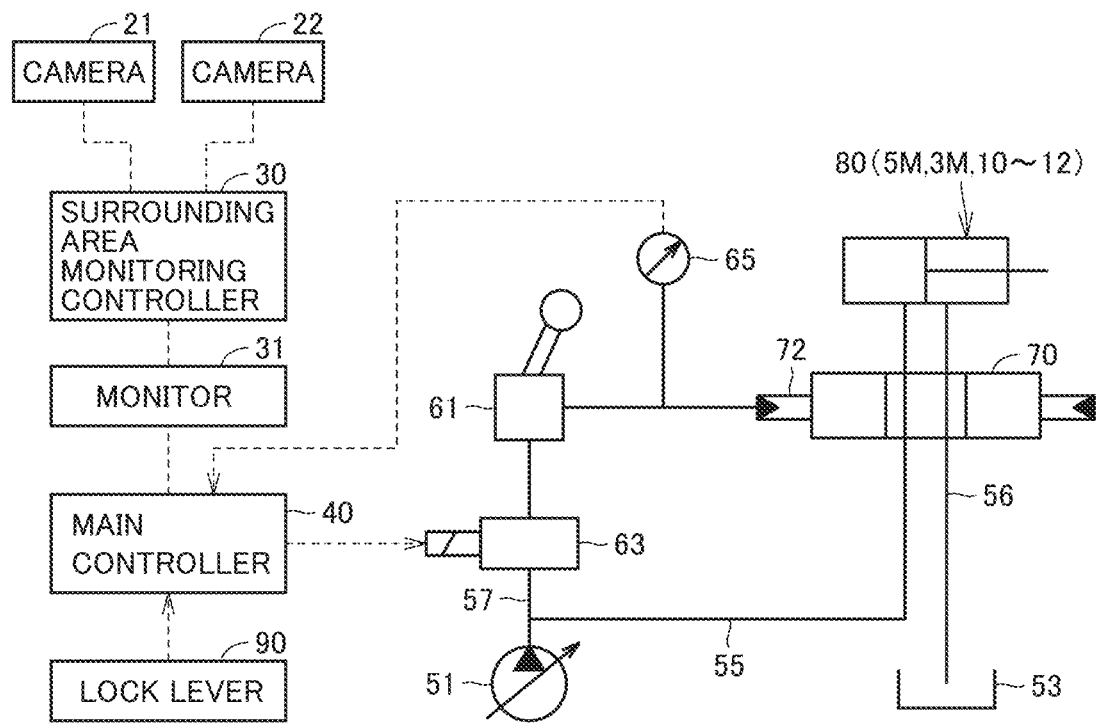
FIG. 2 is a block diagram showing a system configuration of the hydraulic excavator.

FIG. 2 is a block diagram showing the system configuration of hydraulic excavator 100. As shown in FIG. 2, hydraulic excavator 100 mainly includes a surrounding area monitoring controller 30, main controller 40, and a hydraulic circuit that extends from a hydraulic pump 51 to a hydraulic actuator 80. The solid line in FIG. 2 shows this hydraulic circuit. The broken line in FIG. 2 shows an electric circuit. Note that FIG. 2 shows only a part of the electric circuit included in hydraulic excavator 100 in the present embodiment.

The images of the surrounding area of hydraulic excavator 100 that are obtained with camera 20 shown in FIG. 1 are input into surrounding area monitoring controller 30. Among cameras 20 shown in FIG. 1, right front camera 21 and right side camera 22 are representatively shown in FIG. 2, but the images obtained with rear camera 23 and left side camera 24 are also naturally input into surrounding area monitoring controller 30. From the images captured by camera 20, surrounding area monitoring controller 30 produces surrounding images of hydraulic excavator 100 and causes a monitor 31 to display the produced images.

The surrounding images of hydraulic excavator 100 include a mono image formed of an image captured by one of right front camera 21, right side camera 22, rear camera 23, and left side camera 24. Further, the surrounding images of hydraulic excavator 100 include a bird's-eye-view image formed by synthesizing a plurality of images captured by right front camera 21, right side camera 22, rear camera 23, or left side camera 24.

Main controller 40 serves as a controller for controlling the entire operation of hydraulic excavator 100 and is configured of a central processing unit (CPU), a non-volatile memory, a timer, and the like. Main controller 40 causes monitor 31 to display the vehicle body information about hydraulic excavator 100. The vehicle body information about hydraulic excavator 100 includes, for example, the operation mode of hydraulic excavator 100, the amount of remaining fuel indicated by a fuel indicator, the temperature of coolant or the temperature of hydraulic oil that is indicated by a thermometer, the operation status of an air-conditioner, and the like.

The system shown in FIG. 2 is configured such that hydraulic pump 51 is driven by an engine (not shown) and the hydraulic oil discharged from hydraulic pump 51 is supplied through a main valve 70 to various kinds of hydraulic actuators 80. The hydraulic pressure is controlled to be supplied to and discharged from hydraulic actuator 80, to thereby control the operation of work implement 2, the revolution of revolving unit 3, and the traveling operation of traveling unit 5. Hydraulic actuator 80 includes traveling motor 5M shown in FIG. 1 and a revolving motor 3M. Hydraulic actuator 80 includes boom cylinder 10, arm cylinder 11, and bucket cylinder 12 that are shown in FIG. 1.

Revolving motor 3M is an example of the revolving actuator for driving revolving unit 3 to revolve. Revolving motor 3M drives revolving unit 3 to perform a revolving operation. Revolving motor 3M is a hydraulic motor actuated with hydraulic pressure.

Hydraulic pump 51 supplies hydraulic oil used for causing traveling unit 5 to travel and causing revolving unit 3 to revolve. Hydraulic pump 51 is coupled with the drive shaft of the engine. The rotational driving force of the engine is transmitted to hydraulic pump 51 to thereby drive hydraulic pump 51, so that hydraulic pump 51 discharges the pressurized oil. Hydraulic pump 51 serves as a variable displacement hydraulic pump, for example, having a swash plate that is tilted at various angles so as to change the discharge volume.

In tank 53, oil used by hydraulic pump 51 is stored. As hydraulic pump 51 is driven, the oil stored in tank 53 is suctioned from tank 53 and supplied to main valve 70 through a hydraulic oil supply path 55.

Main valve 70 is a spool type valve configured such that a rod-shaped spool is moved to switch the direction in which the hydraulic oil flows. The spool axially moves to adjust the amount of hydraulic oil to be supplied to hydraulic actuator 80, i.e., traveling motor 5M and revolving motor 3M, boom cylinder 10, arm cylinder 11, and bucket cylinder 12. Hydraulic oil is to be supplied to hydraulic actuator 80 for activating the same.

The hydraulic oil discharged from main valve 70 is returned to tank 53 through a hydraulic oil discharge path 56.

Some of oil delivered from hydraulic pump 51 is branched from hydraulic oil supply path 55 and flows into a pilot oil path 57. Some of oil delivered from hydraulic pump 51 is reduced in pressure in a self-pressure reduction valve, and the oil reduced in pressure is used as pilot oil. Pilot oil is to be supplied to main valve 70 for activating the spool of main valve 70. Main valve 70 has a pair of pilot ports 72. As the pilot oil having prescribed hydraulic pressure (pilot pressure) is supplied to each pilot port 72, the spool moves according to the pilot pressure to thereby control main valve 70.

A manipulation device 61 is provided in pilot oil path 57. Manipulation device 61 is manipulated to operate hydraulic excavator 100. The pilot pressure applied to main valve 70 is controlled by manipulation of manipulation device 61. Manipulation device 61 has a manipulation lever. The pilot oil with pressure corresponding to the amount of manipulation of the manipulation lever is output from manipulation device 61 and supplied to each pilot port 72 of main valve 70.

Manipulation device 61 includes a revolving-motion manipulation device. The revolving-motion manipulation device is manipulated by an operator to move revolving unit 3 to revolve. As revolving unit 3 is moved to revolve, the position of revolving unit 3 changes. The revolving-motion manipulation device is disposed, for example, on the side portion of the operator's seat in cab 4. The revolving-motion manipulation device is disposed, for example, on the left side of the operator's seat. The revolving-motion manipulation device includes a revolving-motion manipulation lever, for example.

Manipulation device 61 includes a traveling-motion manipulation device. The traveling-motion manipulation device is manipulated by an operator so as to cause hydraulic excavator 100 to travel, more particularly, so as to drive traveling unit 5 to move hydraulic excavator 100. As hydraulic excavator 100 travels, the position of hydraulic excavator 100 changes. The traveling-motion manipulation device is disposed, for example, forward of the operator's seat in cab 4. The traveling-motion manipulation device includes, for example, a pair of traveling-motion manipulation levers or pedals for the respective crawler belts 5Cr on the right and left sides.

Manipulation device 61 includes a work implement manipulation device. The work implement manipulation device is manipulated by an operator to operate work implement 2. As work implement 2 is operated, the position of work implement 2 changes. More specifically, boom 6 moves in the up-down direction with respect to revolving unit 3, arm 7 moves to rotate about the leading end of boom 6, and bucket 8 moves to rotate about the leading end of arm 7.

The work implement manipulation device is disposed, for example, on the side portion of the operator's seat in cab 4. The work implement manipulation device includes, for example, a first manipulation lever disposed on the right side of the operator's seat and manipulated to operate boom 6 and bucket 8, and a second manipulation lever disposed on the left side of the operator's seat and manipulated to operate arm 7. The second manipulation lever may be the same as the revolving-motion manipulation lever. Also, manipulation of this manipulation lever in the right-left direction may correspond to the operation of arm 7 while manipulation of this manipulation lever in the front-rear direction may correspond to revolution of revolving unit 3.

Pilot oil path 57 is provided with a solenoid valve 63. Solenoid valve 63 is connected to pilot oil path 57 upstream from manipulation device 61 in the direction in which the pilot oil flows. Upon reception of a control signal from main controller 40, solenoid valve 63 is switched between an opened state and a closed state. Solenoid valve 63 adjusts the pilot pressure based on the control signal from main controller 40. Solenoid valve 63 controls pilot oil path 57 to be opened and closed based on the control signal from main controller 40.

When solenoid valve 63 is in an opened state, the pilot oil is supplied through solenoid valve 63 to manipulation device 61. When the manipulation of manipulation device 61 is activated, the flow direction and the flow rate of the hydraulic oil that is supplied from hydraulic pump 51 through main valve 70 to hydraulic actuator 80 are adjusted in accordance with the manipulation of manipulation device 61. When solenoid valve 63 is in a closed state, pilot oil path 57 is blocked to thereby interrupt supply of the pilot oil to manipulation device 61. Since solenoid valve 63 in a closed state blocks the pilot pressure, the hydraulic oil is no longer supplied from hydraulic pump 51 to hydraulic actuator 80 even by manipulation of manipulation device 61, with the result that the operation of hydraulic actuator 80 is restricted.

In this way, supply of hydraulic oil to hydraulic actuator 80 is controlled in accordance with the manipulation of manipulation device 61, to thereby control the output of hydraulic actuator 80, so that the traveling operation of traveling unit 5 and the revolving operation of revolving unit 3 are controlled.

A branch pipe is connected to pilot oil path 57 downstream from manipulation device 61 in the flow direction of the pilot oil. This branch pipe is provided with a pressure gauge 65. Pressure gauge 65 detects the pressure of the pilot oil (pilot pressure) having passed through manipulation device 61. The detection signal showing the pilot pressure detected by pressure gauge 65 is input into main controller 40. The detection signal showing the pilot pressure detected by pressure gauge 65 is an example of the manipulation signal corresponding to the manipulation of manipulation device 61.

Pressure gauge 65 may be a pressure sensor that outputs an electrical signal proportional to the pilot pressure. When the pilot pressure detected by the pressure sensor is equal to or greater than a prescribed threshold value, for example, equal to or greater than 5 kg/cm$^2$, main controller 40 may determine that manipulation device 61 has been manipulated.

Pressure gauge 65 may be a pressure switch that is switched between ON and OFF when the pilot pressure reaches prescribed pressure. The threshold value of the pressure switch may be set at 5 kg/cm$^2$, for example. In this case, when the pressure switch is switched from OFF to ON, main controller 40 may detect that pressure occurs in pilot oil path 57, and then determine that manipulation device 61 has been manipulated.

As shown in FIG. 2, hydraulic excavator 100 further includes a lock lever 90. Lock lever 90 configures a lock unit in the embodiment for stopping functions such as operation of work implement 2, revolution of revolving unit 3, and traveling of traveling unit 5. The position of lock lever 90 is changed to thereby switch lock lever 90 between a locked state and an unlocked state. Lock lever 90 is selectively movable to one of: a locked position where lock lever 90 is in a locked state; and an unlocked position where lock lever 90 is in an unlocked state.

Lock lever 90 is disposed, for example, in the vicinity of the work implement manipulation device. When lock lever 90 is manipulated to be pulled up, lock lever 90 is brought into a locked state to thereby restrict operation of work implement 2, revolution of revolving unit 3, and traveling of traveling unit 5. Even when an operator manipulates manipulation device 61 in the locked state, work implement 2 does not operate, revolving unit 3 does not revolve, and traveling unit 5 does not travel. When lock lever 90 is manipulated to be pushed down, lock lever 90 is brought into an unlocked state, to thereby permit operation of work implement 2, revolution of revolving unit 3, and traveling of traveling unit 5. The operator manipulates manipulation device 61 in the unlocked state, to thereby execute operation of work implement 2, revolution of revolving unit 3, traveling of traveling unit 5, and the like.

Lock lever 90 shown in FIG. 2 is electrically connected to main controller 40 and serves to output an electrical signal to main controller 40 for notifying main controller 40 that lock lever 90 is in the locked state or in the unlocked state. When main controller 40 receives the signal from lock lever 90 indicating that lock lever 90 is in the locked state, main controller 40 outputs a control signal to solenoid valve 63 for bringing solenoid valve 63 into a closed state. In place of this configuration, lock lever 90 may be configured to mechanically block pilot oil path 57 when lock lever 90 is in the locked state and to unblock pilot oil path 57 when lock lever 90 is in the unlocked state.

In the locked state, pilot oil path 57 is blocked to thereby interrupt supply of pilot oil to manipulation device 61, with the result that the pilot pressure downstream of manipulation device 61 is not adjusted by manipulation device 61. Even if manipulation device 61 is manipulated, pressure gauge 65 cannot detect the pilot pressure corresponding to the manipulation of manipulation device 61. Thus, in the locked state, the output of the manipulation signal from manipulation device 61 is restricted.

In the unlocked state, pilot oil path 57 is unblocked, so that the pilot oil is supplied to manipulation device 61. The pilot pressure downstream of manipulation device 61 is adjusted by manipulation device 61. When manipulation device 61 is manipulated, pressure gauge 65 detects the pilot pressure corresponding to manipulation of manipulation device 61. Therefore, in the unlocked state, manipulation device 61 is permitted to output the manipulation signal.

Figure 3:
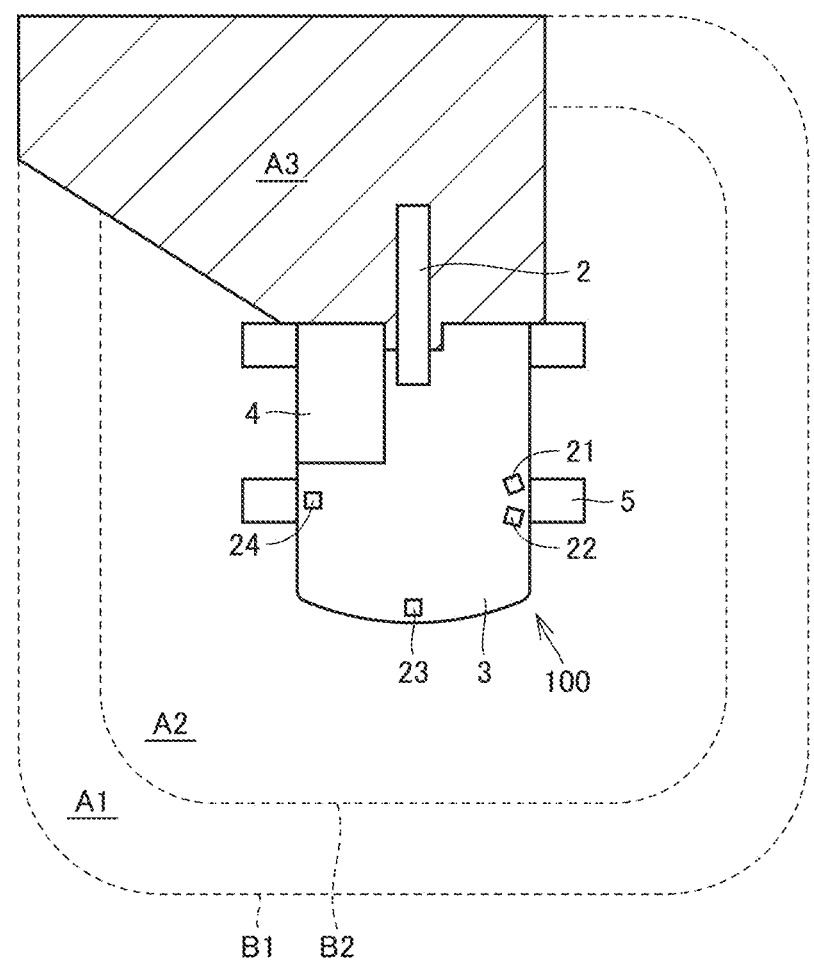
FIG. 3 is a schematic diagram for illustrating each of regions set in a surrounding area of the hydraulic excavator.

FIG. 3 is a schematic diagram for illustrating each of regions set in a surrounding area of hydraulic excavator 100. FIG. 3 schematically shows hydraulic excavator 100 in a plan view. In hydraulic excavator 100 shown in FIG. 3, revolving unit 3 changes its posture shown in FIG. 1 to be rotated by 90° with respect to traveling unit 5. In FIG. 3, the front-rear direction of revolving unit 3 corresponds to the up-down direction in the figure. Crawler belt 5Cr shown in FIG. 3 extends in the right-left direction of revolving unit 3.

As shown in FIG. 3, a first boundary line B1 and a second boundary line B2 are set in a surrounding area of hydraulic excavator 100. First boundary line B1 is set to be more distant from hydraulic excavator 100 than second boundary line B2 is. First boundary line B1 and second boundary line B2 are set to surround hydraulic excavator 100 and to extend substantially in parallel with each other.

First boundary line B1 forms a boundary line employed as a reference for detecting that an obstacle as an object to be recognized (for example, a human) is present inside first boundary line B1, i.e., present close to hydraulic excavator 100 with respect to first boundary line B1. Second boundary line B2 forms a boundary line employed as a reference for restricting the operation of hydraulic excavator 100 when an object to be recognized is present inside second boundary line B2, i.e., present close to hydraulic excavator 100 with respect to second boundary line B2. The region inside second boundary line B2 is referred to as a stop control region A2. The region between first boundary line B1 and second boundary line B2 is referred to as a sensing region A1.

A visible region A3 with a hatching pattern shown in FIG. 3 shows a region that is visible by an operator who is aboard cab 4 and faces forward. Visible region A3 is set forward of revolving unit 3. Visible region A3 is located at a dead angle from camera 20, and thus, not included in the images captured by right front camera 21, right side camera 22, rear camera 23, and left side camera 24. Sensing region A1, stop control region A2, and visible region A3 each are set in a surrounding area of hydraulic excavator 100. Stop control region A2 corresponds to a "set region" in the embodiment.

Camera 20 obtains images of the surrounding area of hydraulic excavator 100 excluding visible region A3. Camera 20 can obtain images showing the inside of sensing region A1, and can also obtain images showing the inside of stop control region A2. Surrounding area monitoring controller 30 determines whether or not the images obtained by camera 20 show an obstacle as an object to be recognized (for example, a human), to thereby detect whether an object to be recognized is present or not in the surrounding area of hydraulic excavator 100. From surrounding area monitoring controller 30, main controller 40 receives an electrical signal indicating the result of detecting whether an object to be recognized is present or not in the surrounding area of hydraulic excavator 100.

Camera 20 and surrounding area monitoring controller 30 constitute a surrounding area monitoring device in the embodiment. From the images showing the inside of sensing region A1 that are obtained by camera 20, surrounding area monitoring controller 30 detects whether an object to be recognized such as a human is present or not inside sensing region A1. From the images showing the inside of stop control region A2 as a set region that are obtained by camera 20, surrounding area monitoring controller 30 detects whether an object to be recognized such as a human is present or not inside stop control region A2.

Figure 4:
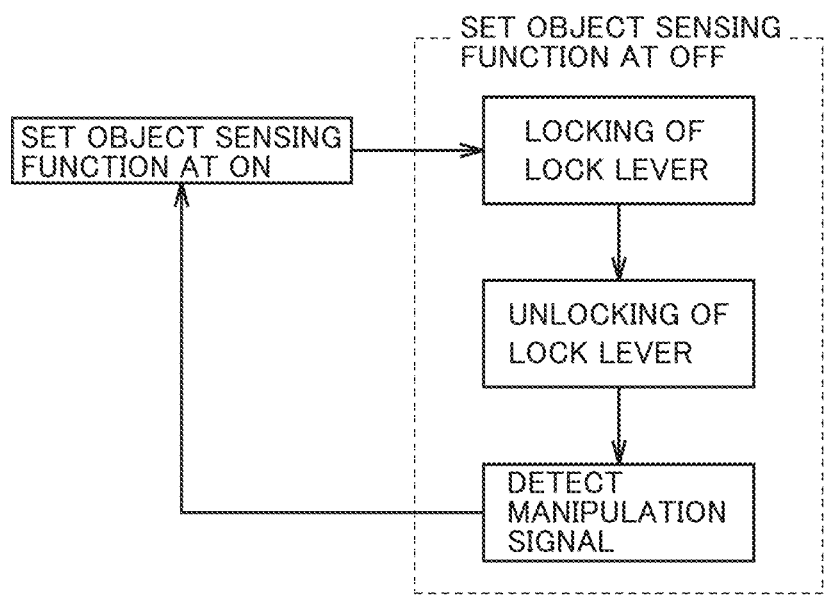
FIG. 4 is a schematic diagram showing a process of switching a setting of an object sensing function between ON and OFF.

Main controller 40 performs an object sensing function. The object sensing function in the present embodiment is a function of restricting the operation of hydraulic excavator 100 upon detection that an object to be recognized such as a human is present inside stop control region A2. Also, in the present embodiment, main controller 40 is capable of switching the object sensing function between an ON setting to execute the object sensing function and an OFF setting not to execute the object sensing function (non-execution). FIG. 4 is a schematic diagram showing a process of switching the setting of the object sensing function between ON and OFF.

Upon detection that an object to be recognized is present inside stop control region A2 in the state where the object sensing function is ON, an alarm is issued. An alarm may visually call operator's attention with an icon indicating this alarm and displayed on monitor 31. An alarm may acoustically call operator's attention with a buzzer and the like.

At this time, main controller 40 restricts the operation of hydraulic actuator 80. When main controller 40 receives the signal indicating that an object is present inside stop control region A2, main controller 40 immediately outputs a control signal to solenoid valve 63 so as to bring solenoid valve 63 into a closed state. Solenoid valve 63 in a closed state blocks pilot oil path 57 to thereby prevent fluctuations of the pilot pressure supplied to pilot port 72 of main valve 70, so that the spool of main valve 70 stops. Thereby, even when manipulation device 61 is manipulated, hydraulic oil is no longer supplied from hydraulic pump 51 to hydraulic actuator 80, with the result that the operation of hydraulic actuator 80 is restricted.

While an object is present inside stop control region A2, main controller 40 restricts the operation of traveling motor 5M. Main controller 40 performs control to prevent traveling motor 5M from driving, and, if traveling motor 5M is operating, to stop the operation of traveling motor 5M to thereby prevent hydraulic excavator 100 from traveling.

While an object is present inside stop control region A2, main controller 40 restricts the operation of revolving motor 3M. Main controller 40 performs control to prevent revolving motor 3M from driving, and, if revolving motor 3M is operating, to stop the operation of revolving motor 3M to thereby prevent revolving motion of revolving unit 3.

On the other hand, while an object is present inside stop control region A2, main controller 40 does not restrict the operations of boom cylinder 10, arm cylinder 11, and bucket cylinder 12. Hydraulic excavator 100 is controlled such that traveling and revolving of hydraulic excavator 100 are restricted as described above but the operation of work implement 2 is not restricted even when an object is present inside stop control region A2.

As shown in FIG. 4, when the object sensing function is set at ON, lock lever 90 is switched to a locked state, and thereby, the setting of the object sensing function is switched to OFF. Even when the operator manipulates manipulation device 61 while lock lever 90 is in the locked state, revolving unit 3 does not revolve and traveling unit 5 does not travel. Even when an obstacle is present inside stop control region A2, neither hydraulic excavator 100 that is traveling nor revolving unit 3 that is revolving does not come into contact with the obstacle. Since hydraulic excavator 100 does not come into contact with an obstacle, no problem occurs even when the object sensing function is set at OFF.

In order to switch the setting of the object sensing function to ON when the object sensing function is set at OFF, lock lever 90 is first switched to an unlocked state. The operator manipulates manipulation device 61 in the unlocked state in which operation of work implement 2, revolution of revolving unit 3, and traveling of traveling unit 5 are permitted. By detecting a manipulation signal, it is determined that this manipulation device 61 has been manipulated. In the system configuration shown in FIG. 2, pressure gauge 65 detects pilot pressure fluctuations, and the detection signal thereof is input into main controller 40, and thus, main controller 40 detects a manipulation signal. Upon detection of the manipulation signal in this way, the setting of the object sensing function is switched to ON.

Manipulation device 61 in this case may be a traveling-motion manipulation device manipulated to cause hydraulic excavator 100 to travel, may be a revolving-motion manipulation device manipulated to operate revolving unit 3 to revolve, or may be a work implement manipulation device manipulated to operate work implement 2. When the operator manipulates manipulation device 61 for the purpose of executing one of operation of work implement 2, revolution of revolving unit 3 and traveling of traveling unit 5, manipulation device 61 outputs a manipulation signal corresponding to the manipulation of manipulation device 61. Main controller 40 detects the manipulation signal, and thereby, the setting of the object sensing function is switched from OFF to ON.

As described above, in hydraulic excavator 100 in the embodiment, manipulation device 61 outputs a manipulation signal corresponding to the manipulation of manipulation device 61 as shown in FIG. 2. As shown in FIG. 4, when the manipulation signal is detected in the state where the object sensing function is set at OFF, the setting of the object sensing function is switched to ON. When the setting of the object sensing function is switched from OFF to ON, non-presence of an object inside stop control region A2 is not applied as a condition for such switching but manipulation of manipulation device 61 by the operator is applied as a condition for such switching.

Hydraulic excavator 100 comes into contact with an obstacle when revolving unit 3 is revolving or hydraulic excavator 100 is traveling. When an operator manipulates the revolving-motion manipulation device or the traveling-motion manipulation device, hydraulic excavator 100 may come into contact with an obstacle. In that case, the setting of the object sensing function is switched to ON. Based on the operator's intention to execute operation of hydraulic excavator 100 such as traveling of hydraulic excavator 100 and revolution of revolving unit 3, the setting of the object sensing function is switched from OFF to ON. Thus, the setting of the object sensing function can be switched from OFF to ON at an appropriate timing when the object sensing function should be activated.

If non-presence of an object inside stop control region A2 is applied as a condition for switching the setting of the object sensing function from OFF to ON, an alarm may be issued even when an operator does not manipulate manipulation device 61 and hydraulic excavator 100 thus does not come into contact with an obstacle. Thereby, the operator inside cab 4 may feel annoyance. As in the present embodiment, however, when manipulation of manipulation device 61 by an operator is applied as a condition for switching the setting, the situation where the operator feels annoyance is eliminated, so that the comfortableness of the operator during work can be improved.

Also when the operator manipulates the work implement manipulation device, the setting of the object sensing function is switched from OFF to ON. When starting the work in the state where the back surface of bucket 8 is placed on the ground surface, the operator first performs the manipulation to raise work implement 2. By the manipulation performed to operate work implement 2, the setting of the object sensing function is switched to ON. Thus, if a human is present inside stop control region A2 at the point of time when work implement 2 is operated, an alarm is issued. This alarm calls operator's attention for warning the operator not to perform the manipulation for revolving or traveling of revolving unit 3 subsequently to the operation of work implement 2. Therefore, it becomes possible to reliably avoid that hydraulic excavator 100 that is traveling or revolving comes into contact with an obstacle.

As shown in FIG. 4, when lock lever 90 is switched to an unlocked state and the manipulation signal is detected in the state where the object sensing function is set at OFF, the setting of the object sensing function is switched to ON. When the setting of the object sensing function is switched from OFF to ON, the procedure is performed in two steps of: unlocking of lock lever 90 by an operator; and manipulation of manipulation device 61 by an operator. Thereby, the operator's intention is more reliably checked, so that the operator can further feel a sense of safety.

As shown in FIG. 4, when lock lever 90 is switched to a locked state in the state where the object sensing function is set at ON, the setting of the object sensing function is switched to OFF. When lock lever 90 is in a locked state, even the manipulation of manipulation device 61 by the operator does not allow revolution of revolving unit 3 and traveling of traveling unit 5, with the result that hydraulic excavator 100 does not come into contact with an obstacle. When an obstacle inside stop control region A2 does not need to be sensed, the object sensing function is set at OFF. Also, when an obstacle inside stop control region A2 needs to be sensed, the object sensing function is set at ON. Thereby, the setting of the object sensing function can be switched between ON and OFF at an appropriate timing. When an obstacle does not need to be sensed, the object sensing function is set at OFF to thereby prevent issuance of an alarm, so that the comfortableness of the operator during work can be improved.

Second Embodiment

Figure 5:
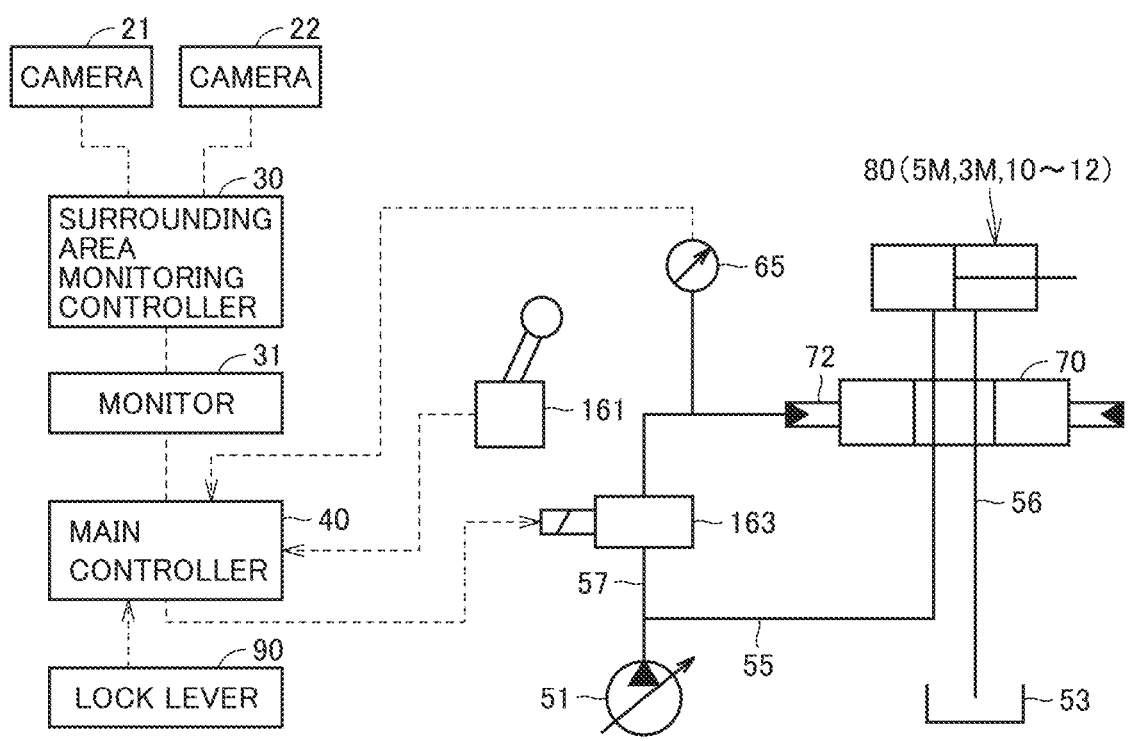
FIG. 5 is a block diagram showing a system configuration of a hydraulic excavator according to a second embodiment.

FIG. 5 is a block diagram showing a system configuration of a hydraulic excavator 100 according to a second embodiment. As compared with the system configuration in the first embodiment shown in FIG. 2, the system configuration in the second embodiment includes an electrical-type manipulation device 161 in place of manipulation device 61 and also includes a proportional solenoid valve 163 in place of solenoid valve 63.

Manipulation device 161 includes a manipulation lever. Manipulation device 161 outputs a detection signal indicating the direction and the amount of manipulation of the manipulation lever to main controller 40. In the second embodiment, the detection signal output from manipulation device 161 corresponds to the manipulation signal corresponding to the manipulation of manipulation device 161.

Main controller 40 outputs a control signal to proportional solenoid valve 163 according to the details of the manipulation of manipulation device 161, and controls the degree of opening of proportional solenoid valve 163. Main controller 40 adjusts the degree of opening of proportional solenoid valve 163 to change the pressure of the pilot oil flowing through pilot oil path 57 to thereby control the pilot pressure supplied to a pair of pilot ports 72 of main valve 70. Pressure gauge 65 detects the pilot pressure adjusted by proportional solenoid valve 163.

When the object sensing function is set at OFF, manipulation device 161 is manipulated to input a manipulation signal to main controller 40, and thus, main controller 40 detects the manipulation signal. Thereby, the setting of the object sensing function is switched from OFF to ON.

As in the first embodiment, also in the system configuration in the second embodiment, manipulation of manipulation device 161 by an operator is defined as a condition for switching the setting of the object sensing function from OFF to ON. Thus, since the setting of the object sensing function is switched from OFF to ON based on the operator's intention, the setting of the object sensing function can be switched from OFF to ON at an appropriate timing when the object sensing function should be activated.

Third Embodiment

Figure 6:
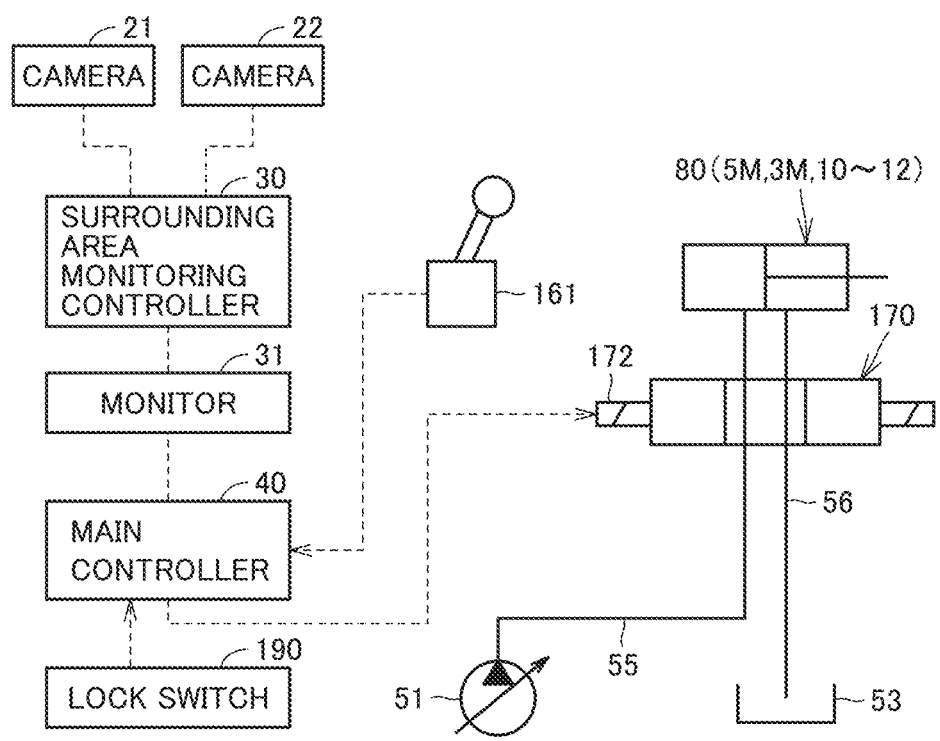
FIG. 6 is a block diagram showing a system configuration of a hydraulic excavator according to a third embodiment.

FIG. 6 is a block diagram showing a system configuration of a hydraulic excavator 100 according to a third embodiment. The system configuration in the third embodiment includes electrical-type manipulation device 161 as in the second embodiment. As compared with the system configuration in the second embodiment shown in FIG. 5, the system configuration in the third embodiment does not include pilot oil path 57. In the third embodiment, main valve 170 includes a solenoid driven-type spool 172 but does not include a pilot port.

Main controller 40 outputs a control signal to spool 172 according to the details of the manipulation of manipulation device 161 and controls the position of spool 172.

The system configuration in the third embodiment includes a lock switch 190 in place of lock lever 90. Lock switch 190 serves as a switch for switching whether or not to permit the operation of hydraulic excavator 100 when manipulation device 161 is manipulated. Lock switch 190 is electrically connected to main controller 40. From lock switch 190, main controller 40 receives a signal indicating whether or not to permit the operation of hydraulic excavator 100.

When main controller 40 receives the signal from lock switch 190 indicating that the operation of hydraulic excavator 100 is not permitted, main controller 40 outputs a control signal to spool 172 so as to stop spool 172. This prevents hydraulic pump 51 from supplying the hydraulic oil to hydraulic actuator 80 even when manipulation device 161 is manipulated. Thus, the operation of hydraulic actuator 80 corresponding to the manipulation of manipulation device 161 is restricted. At this time, the setting of the object sensing function is switched from ON to OFF as in the first embodiment.

When the object sensing function is set at OFF, manipulation device 161 is manipulated to input a manipulation signal to main controller 40, and thus, main controller 40 detects the manipulation signal. Thereby, the setting of the object sensing function is switched from OFF to ON.

As in the first embodiment, also in the system configuration in the third embodiment, manipulation of manipulation device 161 by an operator is defined as a condition for switching the setting of the object sensing function from OFF to ON. Thus, since the setting of the object sensing function is switched from OFF to ON based on the operator's intention, the setting of the object sensing function can be switched from OFF to ON at an appropriate timing when the object sensing function should be activated.

In place of the configuration shown in FIG. 6, hydraulic excavator 100 may be configured not to include lock switch 190. In this case, by bringing manipulation device 161 into a neutral position for a prescribed time period, for example, for ten seconds, the setting of the object sensing function may be switched from ON to OFF. Then, in the state where the object sensing function is set at OFF, the operator may manipulate manipulation device 161 again to thereby switch the setting of the object sensing function from OFF to ON.

In the above description about the examples of the embodiments, hydraulic excavator 100 includes main controller 40, and main controller 40 mounted in hydraulic excavator 100 controls the operation of hydraulic excavator 100. The controller that controls the operation of hydraulic excavator 100 does not necessarily have to be mounted in hydraulic excavator 100.

Figure 7:
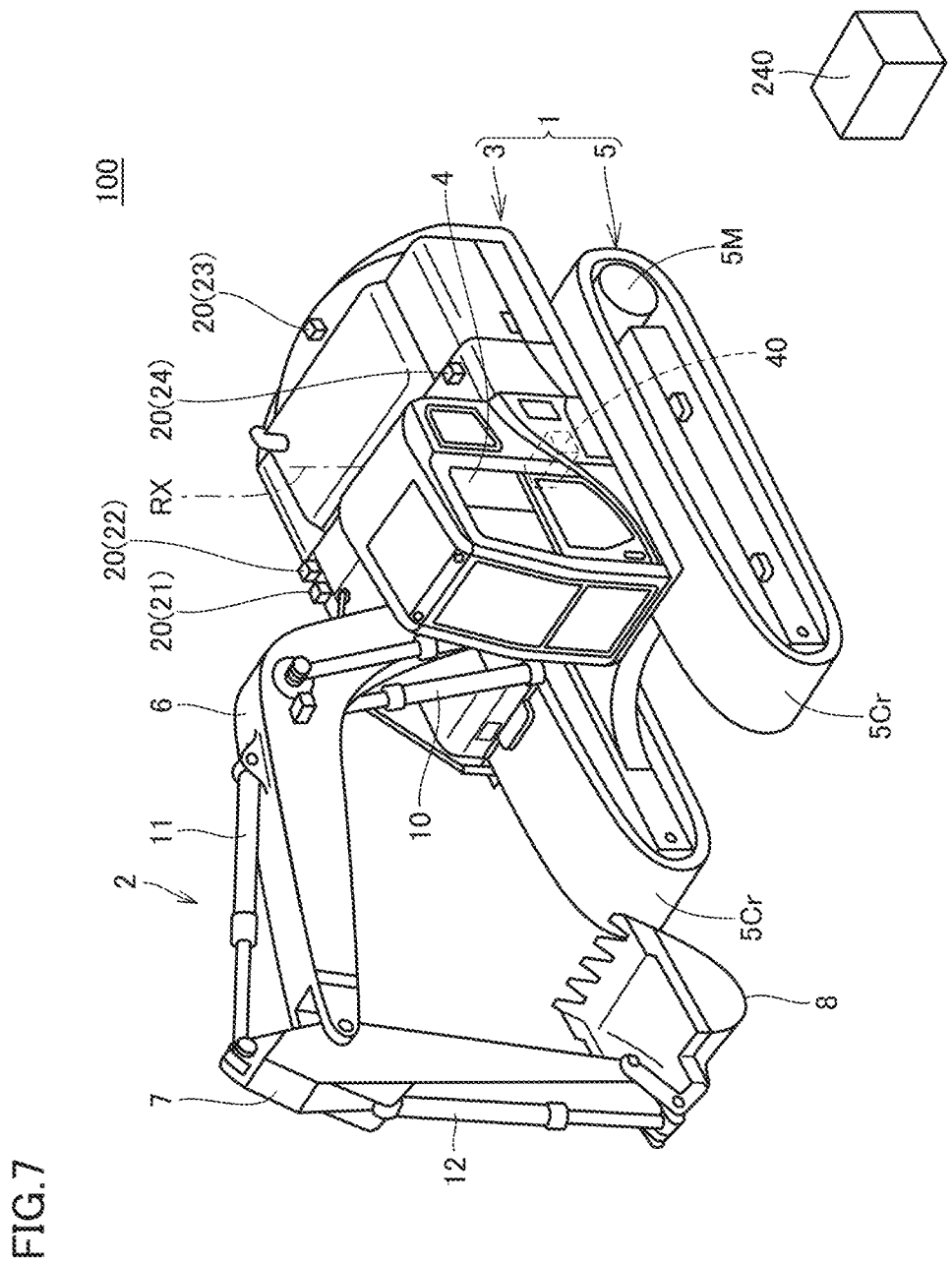
FIG. 7 is a schematic diagram of a control system for a hydraulic excavator.

FIG. 7 is a schematic diagram of a control system for hydraulic excavator 100. An external controller 240 provided separately from main controller 40 mounted in hydraulic excavator 100 may configure a control system for hydraulic excavator 100. Controller 240 may be disposed at the worksite of hydraulic excavator 100 or at a remote location distant from the worksite of hydraulic excavator 100.

In the above explanation, hydraulic excavator 100 has been described as an example of a work machine, but the work machine to which the concept of the present disclosure is applicable may be a wheel loader, a motor grader, a crane, and the like.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 body, 2 work implement, 3 revolving unit, 3M revolving motor, 5 traveling unit, 5Cr crawler belt, 5M traveling motor, 6 boom, 7 arm, 8 bucket, 10 boom cylinder, 11 arm cylinder, 12 bucket cylinder, 20 camera, 21 right front camera, 22 right side camera, 23 rear camera, 24 left side camera, 30 surrounding area monitoring controller, 31 monitor, 40 main controller, 51 hydraulic pump, 53 tank, 55 hydraulic oil supply path, 56 hydraulic oil discharge path, 57 pilot oil path, 61, 161 manipulation device, 63 solenoid valve, 65 pressure gauge 70, 170 main valve, 72 pilot port, 80 hydraulic actuator, 90 lock lever, 100 hydraulic excavator, 163 proportional solenoid valve, 172 spool, 190 lock switch, 240 controller, A1 sensing region, A2 stop control region, A3 visible region, B1 first boundary line, B2 second boundary line, RX revolving axis.

The invention claimed is:

1. A work machine comprising:
    a manipulation device that outputs a manipulation signal to operate the work machine;
    a surrounding area monitoring device that detects whether an object to be recognized is present or not inside a set region that is set in a surrounding area of the work machine; and
    a controller that controls the work machine, wherein
    the controller is capable of switching a setting of an object sensing function between an execution setting to execute the object sensing function and a non-execution setting not to execute the object sensing function, the object sensing function being to restrict an operation of the work machine when the surrounding area monitoring device detects that the object is present inside the set region, and
    when the manipulation signal is detected in a state where the object sensing function is set at the non-execution setting, the controller switches the setting of the object sensing function from the non-execution setting to the execution setting to restrict the operation of the work machine when the object is present inside the set region.

2. The work machine according to claim 1, further comprising a lock unit that is switched between a locked state and an unlocked state, permits the manipulation device to output the manipulation signal in the unlocked state, and restricts outputting of the manipulation signal from the manipulation device in the locked state, wherein
    in a state where the object sensing function is set at non-execution, when the lock unit is switched to the unlocked state and the manipulation signal is detected, the controller switches the setting of the object sensing function to execution.

3. The work machine according to claim 2, wherein, in a state where the object sensing function is set at execution, when the lock unit is switched to the locked state, the controller switches the setting of the object sensing function to non-execution.

4. The work machine according to claim 1, wherein
    the work machine includes a traveling unit that causes the work machine to travel, and
    the manipulation device includes a traveling-motion manipulation device that is manipulated to cause the work machine to travel.

5. The work machine according to claim 1, wherein
    the work machine includes a revolving unit that is capable of revolving with respect to a ground surface, and
    the manipulation device includes a revolving-motion manipulation device that is manipulated to cause the revolving unit to revolve.

6. The work machine according to claim 1, wherein
    the work machine includes a work implement, and the manipulation device includes a work implement manipulation device that is manipulated to operate the work implement.

7. The work machine according to claim 1, wherein the controller is configured to:
   determine whether the manipulation signal from the manipulation device is detected; and
   determine whether the setting of the object sensing function is at the execution setting or the non-execution setting.

8. The work machine according to claim 1, wherein the controller is configured to:
   receive a signal to determine whether an operation of the work machine based on the manipulation signal is permitted; and
   when the operation of the work machine based on the manipulation signal is not permitted, switch the setting of the object sensing function from the execution setting to the non-execution setting.

* * * * *